(12) United States Patent
Ju

(10) Patent No.: US 12,476,335 B2
(45) Date of Patent: Nov. 18, 2025

(54) ELECTRODE ASSEMBLY

(71) Applicant: LG ENERGY SOLUTION, LTD., Seoul (KR)

(72) Inventor: Jeong Hun Ju, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 498 days.

(21) Appl. No.: 18/014,689

(22) PCT Filed: Jul. 16, 2021

(86) PCT No.: PCT/KR2021/009173
§ 371 (c)(1),
(2) Date: Jan. 5, 2023

(87) PCT Pub. No.: WO2022/015101
PCT Pub. Date: Jan. 20, 2022

(65) Prior Publication Data
US 2023/0275329 A1    Aug. 31, 2023

(30) Foreign Application Priority Data

Jul. 16, 2020 (KR) .................. 10-2020-0088408
Jul. 15, 2021 (KR) .................. 10-2021-0093046

(51) Int. Cl.
*H01M 50/538* (2021.01)

(52) U.S. Cl.
CPC ................. *H01M 50/538* (2021.01)

(58) Field of Classification Search
None
See application file for complete search history.

(56) References Cited

U.S. PATENT DOCUMENTS

| 2005/0003264 A1 | 1/2005 | Oh et al. |
| 2010/0104930 A1 | 4/2010 | Kim et al. |

(Continued)

FOREIGN PATENT DOCUMENTS

| CN | 102187496 A | 9/2011 |
| JP | 2001-236983 A | 8/2001 |

(Continued)

OTHER PUBLICATIONS

English langugae machine translation of KR-20040059303-A. (Year: 2025).*

(Continued)

*Primary Examiner* — Eli S Mekhlin
(74) *Attorney, Agent, or Firm* — Birch, Stewart, Kolasch & Birch, LLP

(57) ABSTRACT

An electrode assembly, in which a positive electrode, a separator, a negative electrode are wound in a state of being provided. The positive electrode includes a first positive electrode and a second positive electrode, each of which is manufactured by applying a positive electrode active material on a surface of a positive electrode collector, and the positive electrode active material is not applied on one end of the current collector to form a positive electrode non-coating portion on which the positive electrode collector is exposed, and the positive electrode non-coating portions of the first positive electrode and the second positive electrode are bonded to be connected to each other. An electrode assembly is provided where the negative electrode includes a first negative electrode and a second negative electrode.

20 Claims, 9 Drawing Sheets

(56) References Cited

U.S. PATENT DOCUMENTS

| | | |
|---|---|---|
| 2011/0217577 A1 | 9/2011 | Fukui et al. |
| 2011/0223456 A1 | 9/2011 | Sugaya et al. |
| 2014/0349158 A1 | 11/2014 | Kanemoto et al. |
| 2017/0117574 A1 | 4/2017 | Lee et al. |

FOREIGN PATENT DOCUMENTS

| | | | |
|---|---|---|---|
| JP | 2004-356085 A | 12/2004 | |
| JP | 2008-262777 A | 10/2008 | |
| JP | 2011-204660 A | 10/2011 | |
| JP | WO2013/038946 A1 | 3/2015 | |
| JP | 2015-88272 A | 5/2015 | |
| KR | 20040059303 A * | 7/2004 | ............. H01M 4/13 |
| KR | 10-2008-0037867 A | 5/2008 | |
| KR | 10-2008-0087686 A | 10/2008 | |
| KR | 10-2012-0060537 A | 6/2012 | |
| KR | 10-2015-0049519 A | 5/2015 | |
| KR | 10-1637890 B1 | 7/2016 | |
| KR | 10-2017-0048933 A | 5/2017 | |
| KR | 10-2019-0124039 A | 11/2019 | |

OTHER PUBLICATIONS

International Search Report for PCT/KR2021/009173 mailed on Oct. 28, 2021.
Extended European Search Report for European Application No. 21841678.2, dated Apr. 3, 2024.

* cited by examiner (a)

(b)

(c)

(d)

(e)

ELECTRODE ASSEMBLY

TECHNICAL FIELD

The present application claims the benefit of the priority of Korean Patent Application Nos. 10-2020-0088408, filed on Jul. 16, 2020, and 10-2021-0093046, filed on Jul. 15, 2021, which are hereby incorporated by reference in their entireties.

The present invention relates to an electrode assembly wound in a state in which electrodes and separators are alternately stacked, and more particularly, to an electrode assembly, in which a deviation in N/P ratio (capacity ratio of a positive electrode and a negative electrode per unit area) between the vicinity of a central hole and the vicinity of an outer edge is reduced to realize more stable performance.

BACKGROUND ART

Batteries storing electrical energy may be generally classified into primary batteries and a secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged, and when the oxidation reaction to the material is performed by the current, power is discharged. Here, such the charging-discharging are repeatedly performed.

Among various types of secondary batteries, lithium secondary batteries are generally manufactured by mounting an electrode assembly, in which a positive electrode (cathode), a separator, and a negative electrode (anode) are stacked, in a case. Here, as a process, in which lithium ions are intercalated and deintercalated from lithium metal oxide to the negative electrode, is repeated to charge and discharge the lithium secondary batteries.

In the electrode assembly, a plurality of unit cells, each in which a negative electrode, a separator, and a positive electrode, each of which is generally cut to a predetermined size, are stacked in a predetermined order, are stacked, or an individual positive electrode/separator/negative electrode is repeatedly stacked to form one electrode assembly. Also, the electrode assembly is accommodated in a case such as a cylindrical can and a prismatic pouch.

As a method for manufacturing the electrode assembly, a winding type electrode assembly in which the separator is stacked between the negative electrode and the positive electrode and then wound to manufacture an electrode assembly, a stacking type electrode assembly in which each of a negative electrode and a positive electrode is cut by a desired width and length, and then, the negative electrode, the separator, the positive electrode are repeatedly stacked to form an electrode assembly, and a stack and folding type electrode assembly in which unit cells are placed parallel to each other on a folding separator and then folded from one side to manufacture an electrode assembly have been known.

Among them, the winding type (jelly roll type) electrode assembly is mounted in a state in which a positive electrode 3, separators 2 (2a and 2b), and a negative electrode 4 are stacked on a core 1, and the core 1 rotates to wind the positive electrode 3, the separators 2, and the negative electrode 4 around the core 1, thereby manufacturing the electrode assembly.

Here, as illustrated in FIG. 1B, which illustrates a state in which the positive electrode 3 and the negative electrode 4 are unfolded, the electrode assembly has a structure, in which the negative electrode 4 has a negative electrode non-coating portion 4a, on which a negative electrode active material is not applied, on a surface of a negative electrode collector at the outermost end thereof when the winding is completed, and a negative electrode tab 4b is coupled to the negative electrode non-coating portion 4a, and also, the positive electrode 3 has a positive electrode non-coating portion 3a, on which a positive electrode active material is not applied, on a surface of a positive electrode collector at the middle along a longitudinal direction so that a positive electrode tab 3b is spaced a predetermined distance from the negative electrode tab 4b when the winding is completed, and the positive electrode tab 3b is coupled to the positive electrode non-coating portion 3a.

In addition, as illustrated in FIG. 1A, which illustrates a state in which two sheets of separators are fixed first to the core, and then, the negative electrode and the positive electrode are sequentially put, the separator 2 is put first into the core 1, and then, the negative electrode 4, and the positive electrode 3 are sequentially put into the core 1. That is, in the method for manufacturing the jelly roll type electrode assembly, the core 1 rotates in a state in which starting ends (an end at which the winding starts) of the two sheets of separators 2a and 2b are fixed to the core 1 in a state of overlapping each other, and then, the negative electrode 4 is put, and the positive electrode 3 is put with a slight time difference. Alternatively, the negative electrode 4, the second separator, and the positive electrode 3 may be sequentially put while the first separator 2a is wound around a core 1 according to a manufacturing method.

In addition, when the core 1 rotates by a predetermined number of revolutions in the state in which the positive electrode 3 is input, a cylindrical electrode assembly is manufactured in a wound state in the stacked state in the order of the separator/negative electrode/separator/positive electrode.

In the case of such a cylindrical electrode assembly, it is important to design the electrodes (the negative electrode and the positive electrode) in order to maximize performance and stability within a limited space.

Particularly, in the cylindrical electrode assembly, the positive electrode 3 and the negative electrode 4 have different ratios in contact area between the positive electrode 3 and the negative electrode 4 by a curvature from the vicinity of the central hole (formed in a position from which the core is removed) to the outside, and thus, an imbalance in N/P ratio (capacity ratio in active material of the positive electrode and the negative electrode per unit area) of the positive electrode 3 and the negative electrode 4 occurs. The N/P ratio capable of being calculated by the following equation varies depending on the ratio in contact area between the positive electrode 3 and the negative electrode 4.

N/P ratio=negative electrode charging capacity per unit area $(mHh/cm^2)$×negative electrode efficiency (%)/designed capacity of positive electrode per unit area $(mHh/cm^2)$ That is, as illustrated in FIG. 1C, which illustrates a state in which an area A in the vicinity of the central hole and an outer area B in the cylindrical electrode assembly are displayed, when the capacity of the positive electrode 3 per unit area (capacity to accommodate electrons per unit area) is the same overall, the N/P ratio of the area A in the vicinity of the central hole may be less than 100%, but the N/P ratio of the outer area B may exceed 100%. Thus, deterioration of the electrode is accelerated on the area A in the vicinity of the central hole to have a bad influence on the lifespan of the secondary battery.

DISCLOSURE OF THE INVENTION

Technical Problem

Therefore, a main object of the present invention for solving the above problem is to provide an electrode assembly, in which a positive electrode capacity on an area in the vicinity of a central hole and a positive electrode capacity in an outer area are different from each other, or a positive electrode capacity on the area in the vicinity of the central hole and a positive electrode capacity in the outer area are different from each other to reduce a deviation in N/P ratio.

Technical Solution

The present invention for achieving the above object provides an electrode assembly, in which a positive electrode, a separator, a negative electrode are wound in a state of being stacked, wherein the positive electrode comprises a first positive electrode and a second positive electrode, wherein each of the first positive electrode and the second positive electrode includes a positive electrode active material on a surface of a positive electrode collector, wherein the positive electrode active material is not applied on one end of the current collector to form a positive electrode non-coating portion on which the positive electrode collector is exposed, and wherein the positive electrode non-coating portions of the first positive electrode and the second positive electrode are connected to each other.

A capacity per unit area of the first positive electrode and a capacity per unit area of the second positive electrode may be different from each other.

The positive active material applied to the first positive electrode and the positive electrode active material applied to the second positive electrode may be manufactured by mixing the same compositions, and wherein a composition ratio of the positive electrode active material applied to the first positive electrode and a composition ratio of the positive electrode active material applied to the second positive electrode may be different based on an atomic ratio or a mass ratio so that the capacity per unit area of the first positive electrode and the capacity per unit area of the second positive electrode are different from each other.

An amount of the positive electrode active material applied to the first positive electrode and an amount of the positive electrode active material applied to the second positive electrode may be the same.

In addition, the positive active material applied to the first positive electrode and the positive electrode active material applied to the second positive electrode may be manufactured by mixing the same compositions, and wherein an amount of the positive electrode active material applied to the first positive electrode and an amount of the positive electrode active material applied to the second positive electrode may be different so that the capacity per unit area of the first positive electrode and the capacity per unit area of the second positive electrode are different from each other.

The amount of positive electrode active material applied to the first positive electrode and the amount of positive electrode active material applied to the second positive electrode may have the same composition ratio based on an atomic ratio or a mass ratio.

The positive active material applied to the first positive electrode and the positive electrode active material applied to the second positive electrode may be manufactured by mixing the same compositions, and wherein an amount of the positive electrode active material applied to the first positive electrode and a composition ratio of the positive electrode active material applied to the first positive electrode are different from an amount of the positive electrode active material applied to the second positive electrode and a composition ratio of the positive electrode active material applied to the second positive electrode so that the capacity per unit area of the first positive electrode and the capacity per unit area of the second positive electrode are different from each other.

Furthermore, a positive electrode tab is overlappingly connected to a point at which the positive electrode non-coating portion of the first positive electrode and the positive electrode non-coating portion of the second positive electrode may be connected to each other.

Here, the positive electrode tab may have a first side welded to the positive electrode non-coating portion of the first positive electrode and a second side welded to the positive electrode non-coating portion of the second positive electrode.

The first positive electrode may be manufactured so that at least one of an amount of the positive electrode active material applied to a first surface of the positive electrode collector or a composition ratio based on an atomic ratio or a mass ratio of the positive electrode active material is different from that of the positive electrode active material applied to a second surface of the positive electrode collector so that a capacity per unit area on the first surface and a capacity per unit area on the second surface are different from each other.

The second positive electrode may be manufactured so that at least one of an amount of the positive electrode active material applied to a first surface of the positive electrode collector or a composition ratio based on an atomic ratio or a mass ratio of the positive electrode active material is different from that of the positive electrode active material applied to a second surface of the positive electrode collector so that a capacity per unit area on the first surface and a capacity per unit area on the second surface are different from each other.

Furthermore, the present invention further provides a structure in which the negative electrode is divided as well as the structure in which the positive electrode is divided as described above. That is, in an electrode assembly, in which a positive electrode, a separator, a negative electrode are wound in a state of being stacked, according to the present invention having the above-described technical features, wherein the negative electrode comprises a first negative electrode and a second negative electrode, wherein each of the first negative electrode and the second negative electrode includes a negative electrode active material on a surface of a negative electrode collector, wherein the negative electrode active material is not applied on one end of the current collector to form a negative electrode non-coating portion on which the negative electrode collector is exposed, and wherein the negative electrode non-coating portions of the first negative electrode and the second negative electrode are connected to each other.

The negative active material applied to the first negative electrode and the negative electrode active material applied to the second negative electrode may be manufactured by mixing the same compositions, and wherein a composition ratio of the negative electrode active material applied to the first negative electrode and a composition ratio of the negative electrode active material applied to the second negative electrode may be different based on an atomic ratio or a mass ratio.

An amount of the negative electrode active material applied to the first negative electrode and an amount of the negative electrode active material applied to the second negative electrode may be the same.

Alternatively, the negative active material applied to the first negative electrode and the negative electrode active material applied to the second negative electrode may be manufactured by mixing the same compositions, and wherein an amount of the negative electrode active material applied to the first negative electrode and an amount of the negative electrode active material applied to the second negative electrode are different.

A negative electrode tab may be overlappingly connected to a point at which the negative electrode non-coating portion of the first negative electrode and the negative electrode non-coating portion of the second negative electrode are connected to each other.

The negative electrode tab may have a first side welded to the negative electrode non-coating portion of the first negative electrode and a second side welded to the negative electrode non-coating portion of the second negative electrode.

Alternatively, a negative electrode non-coating portion is additionally formed on the first negative electrode at an end opposite to the side connected to the second negative electrode, and a negative electrode non-coating portion is additionally formed on the second negative electrode at an end opposite to the side connected to the first negative electrode (like the structure according to the related art, which is illustrated in FIG. 1B), wherein a negative electrode tab is connected to any one of the negative electrode non-coating portion additionally formed on the first negative electrode or the negative electrode non-coating portion additionally formed on the second negative electrode.

In addition, a secondary battery in which the electrode assembly having the above-described technical features is embedded in a case may be additionally provided.

Advantageous Effects

In the electrode assembly having the above configuration according to the present invention, since the positive electrode has the structure in which the first positive electrode and the second positive electrode are bonded to each other, the first positive electrode and the second positive electrode may be individually manufactured and thus may be determined in capacity per unit area according to whether the first and second positive electrodes are disposed at the central side or the outer side to reduce the deviation in N/P ratio when compared to the structure according to the related art.

Here, the capacities per unit area of the first positive electrode and the second positive electrode may be different from each other, and the first positive electrode and the second positive electrode have thicknesses different from each other. In addition, since the capacity per unit area of the one surface and the other surface may also be different from each other, the capacity per unit area may be adjusted according to the wound position.

In addition, since the positive electrode tab is overlappingly bonded to the point at which the positive electrode non-coating portion of the first positive electrode and the positive electrode non-coating portion of the second positive electrode are bonded to each other, the bonding force between the first positive electrode and the second positive electrode may increase.

In addition, since the technical features applied to the positive electrode as described above may also be equally applied to the negative electrode, there may be the effect of flexibly determining whether the technical features are applied to the positive electrode or the negative electrode according to the manufacturing conditions.

MODE FOR CARRYING OUT THE INVENTION

Figure 1A:
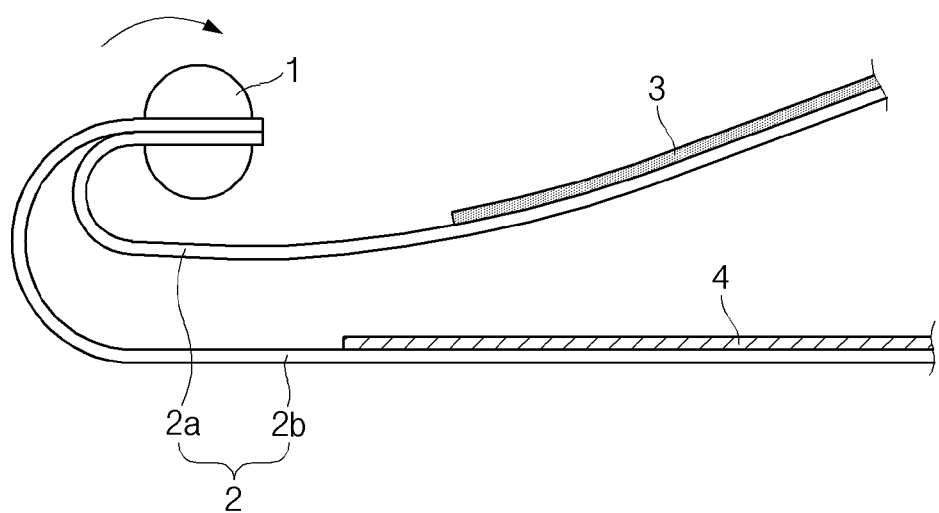
FIG. 1A is a view illustrating a state in which two sheets of separators are fixed first to a core, and then, a negative electrode and a positive electrode are sequentially put.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly, in which a first positive electrode 10 and a second positive electrode 20, which have different capacities per unit area to suppress or at least alleviate the problem of occurrence of a deviation in N/P ratio between an area in the vicinity of a central hole and an outer area, and an electrode assembly, in which a first negative electrode 40 and a second negative electrode 50 are bonded to form a negative electrode 200. Hereinafter, the present invention will be described in more detail with reference to the accompanying drawings.

Electrode Assembly Applied to Positive Electrode

Figure 2:
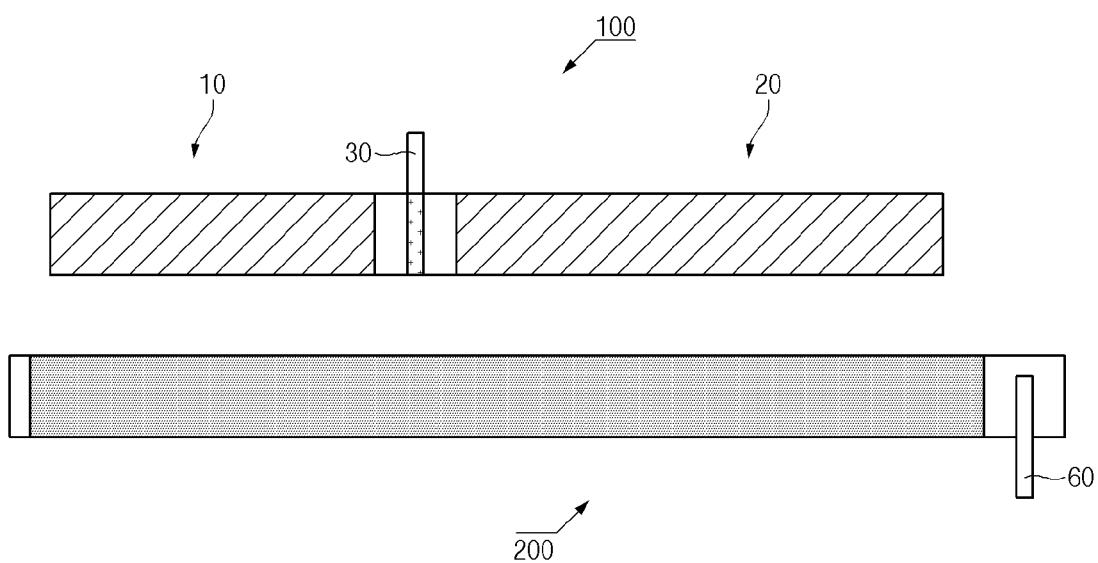
FIG. 2 is a view illustrating a state in which a positive electrode and a negative electrode are unfolded, wherein the positive electrode is configured so that a first positive electrode and a second positive electrode are bonded to each other.
Figure 3:
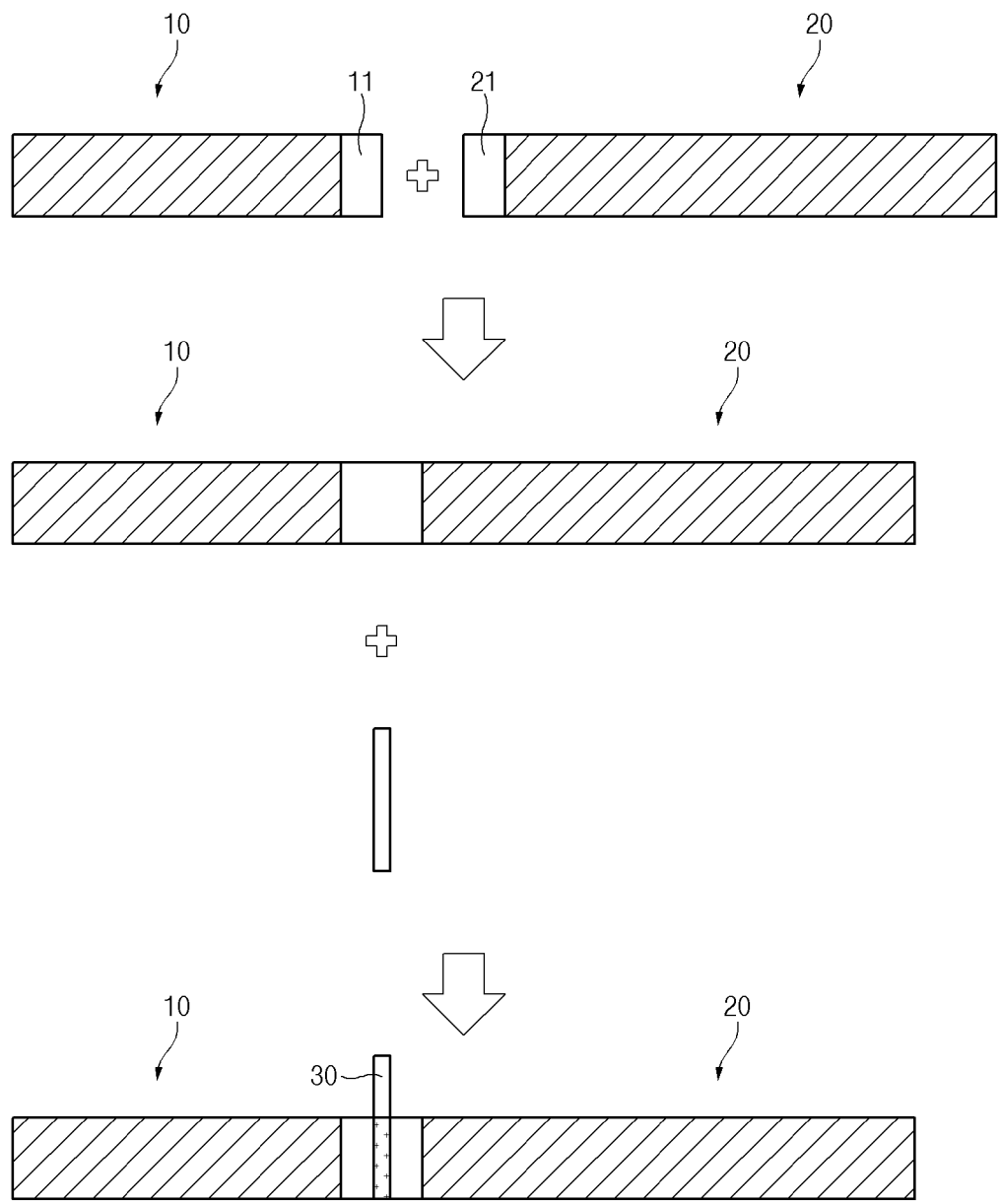
FIG. 3 is a view illustrating a state in which a positive electrode tab is additionally bonded to a point at which the first positive electrode and the second positive electrode are bonded to each other after the first positive electrode and the second positive electrode are bonded to each other.

FIG. 2 is a view illustrating a state in which a positive electrode 100 and a negative electrode 200 are unfolded, wherein the positive electrode 100 is configured so that a first positive electrode 10 and a second positive electrode 20 are bonded to each other, and FIG. 3 is a view illustrating a state in which a positive electrode tab 30 is additionally bonded to a point at which the first positive electrode 10 and the second positive electrode 20 are bonded to each other after the first positive electrode 10 and the second positive electrode 20 are bonded to each other.

Referring to FIGS. 2 and 3, an electrode assembly of the present invention is an electrode assembly manufactured by winding a separator, the negative electrode 200, a separator, and the positive electrode 100, which are in a stacked state. When starting ends of two sheets of separators are wound around a core, the negative electrode 200 and the positive electrode 100 are sequentially put to manufacture the electrode assembly.

Here, in the electrode assembly according to the present invention, the positive electrode 100 is configured so that the first positive electrode 10 and the second positive electrode 20, which have different capacities per unit area, are bonded to each other.

That is, the first positive electrode 10 is manufactured by applying a positive electrode active material on a surface of a positive electrode collector, and the second positive electrode 20 is also manufactured by applying the positive electrode active material on a surface of a positive electrode collector.

In addition, each of the first positive electrode 10 and the second positive electrode 20 has a structure in which positive electrode non-coating portions 11 and 21, on which the positive electrode active material is not applied to expose the positive electrode collector, are formed on ends thereof, and the positive electrode non-coating portions 11 and 21 of the second positive electrode 20 are bonded to each other through welding or a conductive adhesive.

Furthermore, a positive electrode tab 30 is overlappingly bonded to a point at which the positive electrode non-coating portion 11 of the first positive electrode 10 and the positive electrode non-coating portion 21 of the second positive electrode 20 are bonded to each other. In more detail, the positive electrode tab 30 is bonded so that one side thereof is welded to the positive electrode non-coating portion 11 of the first positive electrode 10, and the other side thereof is welded to the positive electrode non-coating portion 21 of the second positive electrode 20. Thus, the positive electrode tab 30 may allow the first positive electrode 10 and the second positive electrode 20 to increase in bonding force therebetween.

Figure 4:
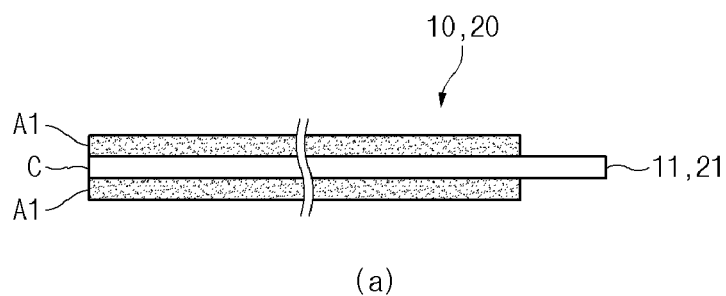
FIG. 4 is a cross-sectional view (a) illustrating a state in which a positive electrode active material having the same composition ratio is applied on both surfaces of the first positive electrode and the second positive electrode, a cross-sectional view (b) illustrating positive electrode active materials having different composition ratios are applied on one surface and the other surface, respectively, and a cross-sectional view (c) illustrating a state in which a positive electrode active material having the same composition ratio is applied in different amounts on both side surfaces.
Figure 4:
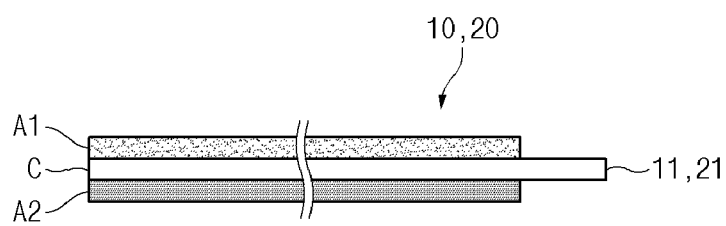
Figure 4:
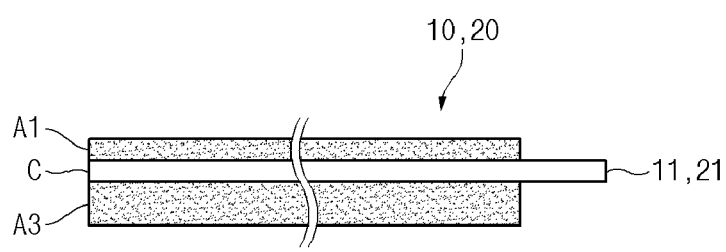

FIG. 4 is a cross-sectional view (a) illustrating a state in which a positive electrode active material having the same composition ratio is applied on both surfaces of the first positive electrode 10 and the second positive electrode 20, a cross-sectional view (b) illustrating positive electrode active materials having different composition ratios are applied on one surface and the other surface, respectively, and a cross-sectional view (c) illustrating a state in which a positive electrode active material having the same composition ratio is applied in different amounts on both side surfaces.

As illustrated in (a) of FIG. 4, the first positive electrode 10 and the second positive electrode 20 may be applied so that a positive electrode active material A1 having the same composition ratio has the same thickness on one side and the other side of a positive electrode collector C.

Also, as illustrated in (b) of FIG. 4, a positive electrode active material A2, which is composed of a different composition ratio by increasing or decreasing in content of a specific composition related to stability or capacity so as to be different from the composition ratio of the positive electrode active material A1 applied to the one surface, may be applied to the other surface of the positive electrode collector C so that capacities per unit area of both surfaces are different from each other.

Alternatively, as illustrated in (c) of FIG. 4, the positive electrode active materials A1 and A3 having the same composition ratio may be applied to both surfaces, but the capacities per unit area may be different from each other by a more amount of positive electrode active material on the other surface than that of the positive electrode active material applied on the one surface.

That is, in the present invention, all of the first positive electrode 10 and the second positive electrode 20 or any one of the first positive electrode 10 and the second positive electrode 20 may be manufactured so that at least one of the amount of positive electrode active material A1 applied to the one surface of the positive electrode collector C; or a composition ratio based on an atomic ratio or mass ratio of the positive electrode active material A1 is different from that of each of the positive electrode active materials A2 and A3 applied to the other surface of the positive electrode collector C. As a result, the capacity per unit area on the one surface and the capacity per unit area on the other surface may be different from each other.

Therefore, the present invention provides embodiments in which capacities per unit area of the first positive electrode 10 and the second positive electrode 20 are differently formed by combining the above characteristics.

First Embodiment

Figure 5:
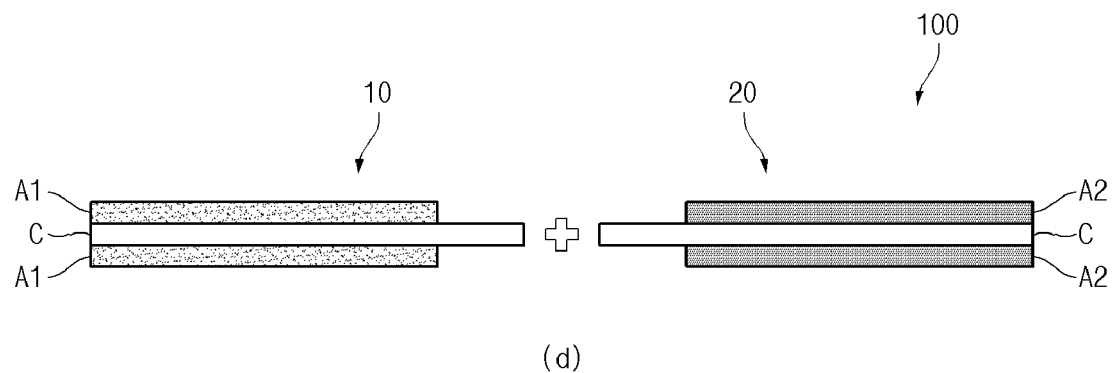
FIG. 5 is a view illustrating a state (d) before the first positive electrode and the second positive electrode, to which positive electrode active materials having different composition ratios are applied, respectively, are bonded to each other and a state (e) before the first positive electrode and the second positive electrode, to which a positive electrode active material having the same composition ratio is applied in different amounts, are bonded to each other.
Figure 5:
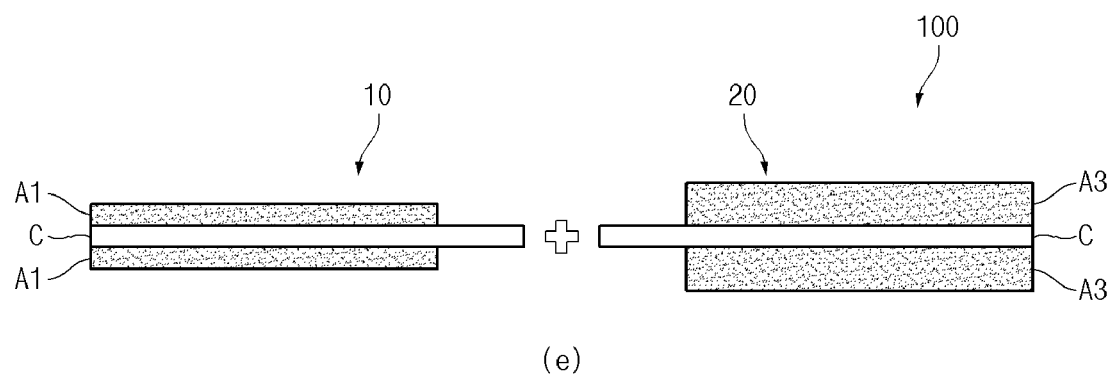

FIG. 5 is a view illustrating a state (d) before the first positive electrode 10 and the second positive electrode 20, to which positive electrode active materials having different composition ratios are applied, respectively, are bonded to each other and a state (e) before the first positive electrode 10 and the second positive electrode 20, to which a positive electrode active material having the same composition ratio is applied in different amounts, are bonded to each other.

In this embodiment, the positive electrode active material A1 applied to the first positive electrode 10 and the positive electrode active material A2 applied to the second positive electrode 20 are manufactured by mixing the same compositions, but a composition ratio of the positive electrode active material A1 applied to the first positive electrode 10 and a composition ratio of the positive electrode active material A2 applied to the second positive electrode 20, based on an atomic ratio or mass ratio, are set to be different from each other, and thus, the capacity per unit area of the first positive electrode 10 and the capacity per unit area of the second positive electrode 20 may be different from each other.

That is, as illustrated in (d) of FIG. 5, the composition ratio of the positive electrode active material applied to the positive electrode collector C may vary, and thus, the capacities per unit area of the first positive electrode 10 and the second positive electrode 20 may be different from each other.

Here, the positive active material A1 applied to the first positive electrode 10 and the positive electrode active material A2 applied to the second positive electrode 20 may be applied in the same amount (may have the same thickness).

Second Embodiment

In addition, as illustrated (e) of FIG. 5, a positive electrode active material A1 applied to the first positive electrode 10 and a positive electrode active material A3 applied to the second positive electrode 20 are manufactured by mixing the same compositions, but an amount of positive electrode active material A1 applied to the first positive electrode 10 and an amount of positive electrode active material A3 applied to the second positive electrode 20, are set to be different from each other, and thus, the capacity per unit area of the first positive electrode 10 and the capacity per unit area of the second positive electrode 20 may be different from each other.

Here, the positive electrode active material A1 applied to the first positive electrode 10 and the positive electrode active material A2 applied to the second positive electrode 20 may be manufactured to have the same composition ratio based on an atomic ratio or mass ratio.

Alternatively, the positive active material applied to the first positive electrode 10 and the positive electrode active material applied to the second positive electrode 20 are manufactured by mixing the same compositions according to a combination of the first embodiment and the second embodiment, but an amount of positive electrode active material applied to the first positive electrode; and a composition ratio based on an atomic ratio or mass ratio of the positive electrode active material may be set to be different from an amount of positive electrode active material applied to the second positive electrode 20 and a composition ratio based on an atomic ratio or mass ratio of the positive electrode active material. As a result, the capacity per unit area of the first positive electrode 10 and the capacity per unit area of the second positive electrode 20 may be different from each other.

Furthermore, although only the connection structure of the first positive electrode 10 and the second positive electrode 20 having different capacities per unit area has been described in the present invention, a positive electrode non-coating portion 21 may be additionally formed at an opposite end of the second positive electrode 20, and then, a third positive electrode and a fourth positive electrode, each of which has the positive electrode non-coating portion, may be sequentially connected. In this case, a capacity per unit area of each of the additionally connected third and fourth electrodes may be different from that of each of the first and second electrodes.

Electrode Assembly Applied to Negative Electrode

As described above, in the electrode assembly according to the present invention, the configuration applied to the positive electrode may be equally applied to the negative electrode.

Figure 6:
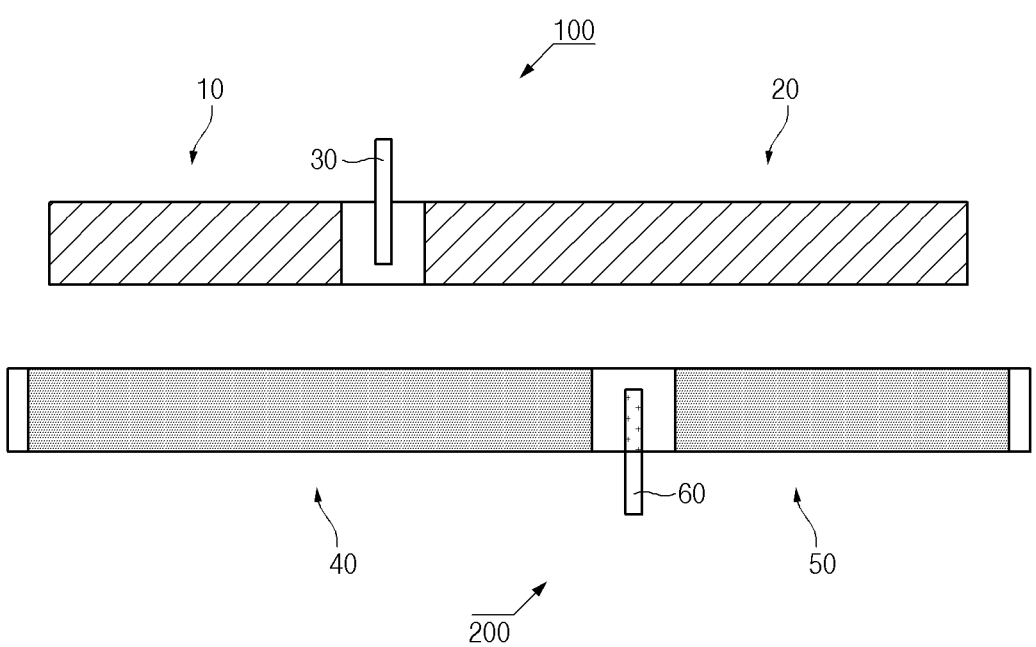
FIG. 6 is a view illustrating a state in which the positive electrode and the negative electrode are unfolded, wherein the negative electrode is configured so that a first negative electrode and a second negative electrode are bonded to each other.
Figure 7:
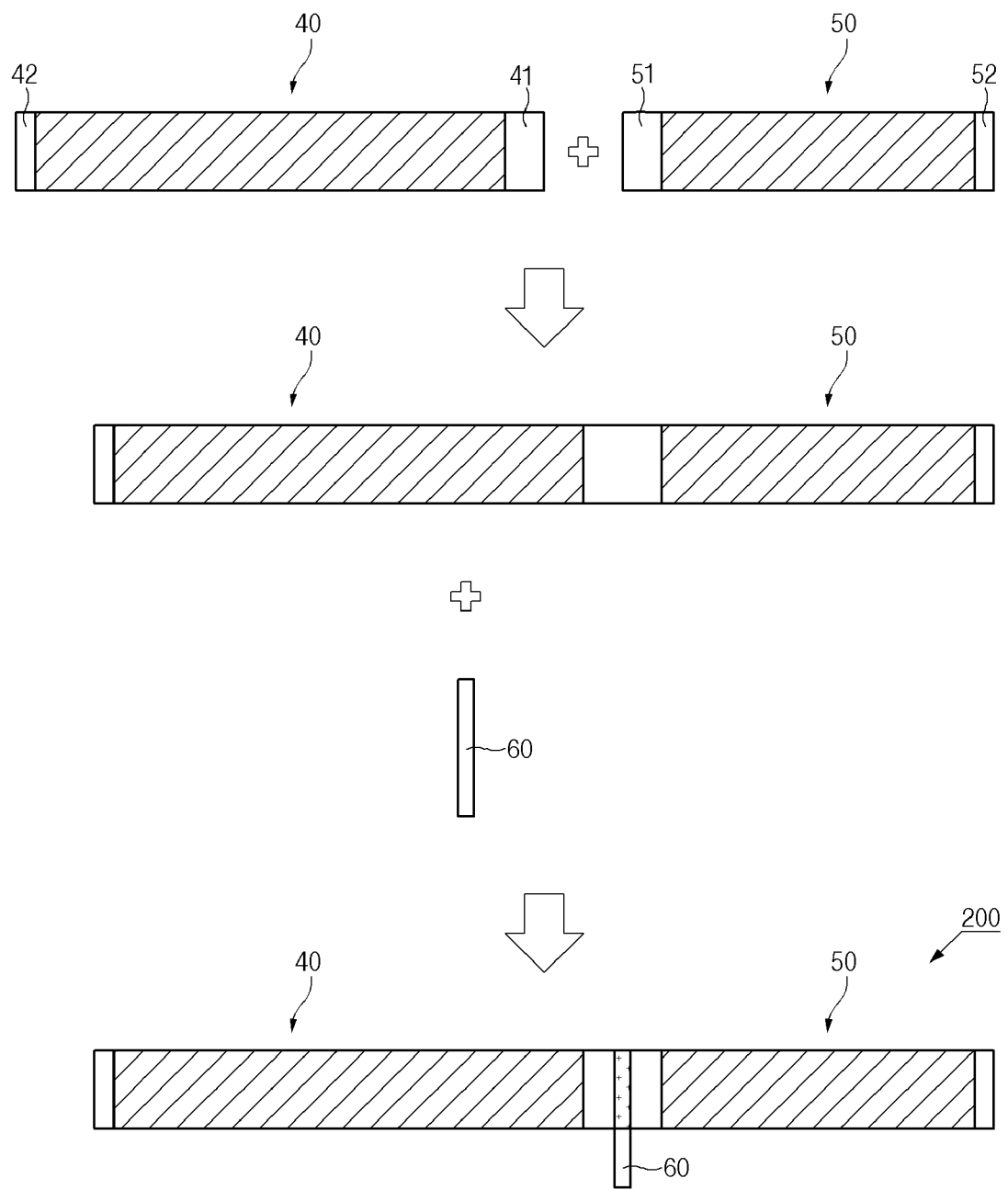
FIG. 7 is a view illustrating a state in which a negative electrode tab is additionally bonded to a point at which the first negative electrode and the second negative electrode are bonded to each other after the first negative electrode and the second negative electrode are bonded to each other.

FIG. 6 is a view illustrating a state in which the positive electrode and the negative electrode are unfolded, wherein the negative electrode 200 is configured so that a first negative electrode 40 and a second negative electrode 50 are bonded to each other, and FIG. 7 is a view illustrating a state in which a negative electrode tab is additionally bonded to a point at which the first negative electrode 40 and the second negative electrode 50 are bonded to each other after the first negative electrode 40 and the second negative electrode 50 are bonded to each other.

Referring to FIGS. 6 and 7, an electrode assembly having a structure, in which two negative electrodes are connected to each other, according to the present invention is an electrode assembly manufactured by winding a separator, the negative electrode 200, a separator, and the positive electrode 100, which are in a stacked state. When starting ends of two sheets of separators are wound around a core, the negative electrode 200 and the positive electrode 100 are sequentially put to manufacture the electrode assembly.

Here, in the electrode assembly according to the present invention, the negative electrode 200 is configured so that the first negative electrode 40 and the second negative electrode 50, which have different capacities per unit area, are bonded to each other.

That is, like the above-described structure of the positive electrode, the first negative electrode 40 is manufactured by applying a negative electrode active material on a surface of a negative electrode collector, and the second negative electrode 50 is also manufactured by applying the negative electrode active material on a surface of a negative electrode collector.

In addition, each of the first negative electrode 40 and the second negative electrode 50 has a structure in which negative electrode non-coating portions 41 and 41, on which the negative electrode active material is not applied to expose the negative electrode collector, are formed on ends thereof, and the negative electrode non-coating portions 41 and 51 of the second negative electrode 50 are bonded to each other through welding or a conductive adhesive.

Furthermore, a negative electrode tab 60 is overlappingly bonded to a point at which the negative electrode non-coating portion 41 of the first negative electrode 40 and the negative electrode non-coating portion 51 of the second negative electrode 50 are bonded to each other. In more detail, the negative electrode tab 60 is bonded so that one side thereof is welded to the negative electrode non-coating portion 41 of the first negative electrode 40, and the other side thereof is welded to the negative electrode non-coating portion 51 of the second negative electrode 50. Thus, the negative electrode tab 60 may allow the first negative electrode 40 and the second negative electrode 50 to increase in bonding force therebetween.

Figure 1B:
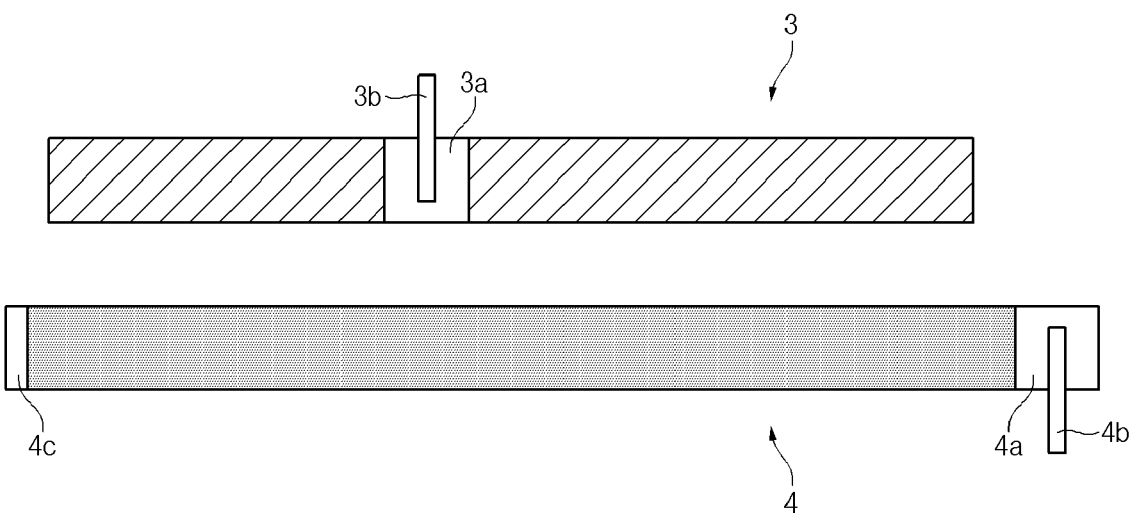
FIG. 1B is a view illustrating a state in which the positive electrode and the negative electrode, which are put as illustrated in FIG. 1A, according to the related art are unfolded.
Figure 1C:
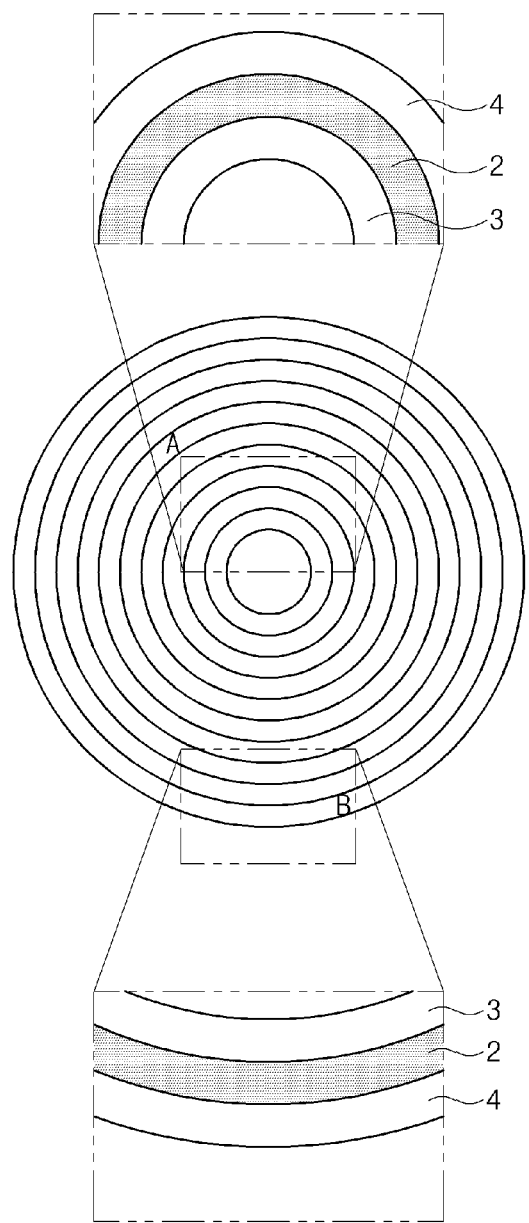
FIG. 1C is a view illustrating a state in which an area A in the vicinity of a central hole and an outer area B in a cylindrical electrode assembly are disposed.

For reference, like the structure (the structure illustrated in FIG. 1B) according to the related art, the negative electrode tab 60 may be bonded to one end of the negative electrode. That is, a negative electrode non-coating portion 42 may be additionally formed on the first negative electrode 40 at an end opposite to the side connected to the second negative electrode 50, and a negative electrode non-coating portion 52 may be additionally formed on the second negative electrode 50 at an end opposite to the side connected to the first negative electrode 40. In addition, the electrode assembly may have a structure, in which the negative electrode tab 60 is bonded to any one of the negative electrode non-coating portion 42 additionally formed on the first negative electrode 40 or the negative electrode non-coating portion 52 additionally formed on the second negative electrode 50.

Furthermore, like the above-described structure of the positive electrode, each of the first negative electrode 40 and the second negative electrode 50 may have a structure in which a negative active material having the same composition ratio is applied at the same thickness to one side and the other side of the negative electrode collector.

In addition, a positive electrode active material, which is composed of a different composition ratio by increasing or decreasing in content of a specific composition related to stability or capacity so as to be different from the composition ratio of the positive electrode active material applied to the one surface, may be applied to the other surface of the positive electrode collector so that capacities per unit area of both surfaces are different from each other.

Alternatively, the positive electrode active materials having the same composition ratio may be applied to both surfaces of the negative electrode collector, but the capacities per unit area may be different from each other by a more amount of positive electrode active material on the other surface than that of the positive electrode active material applied on the one surface.

That is, all of the first negative electrode 40 and the second negative electrode 50 or any one of the first negative electrode 40 and the second negative electrode 50 may be manufactured so that at least one of the amount of negative electrode active material applied to the one surface of the negative electrode collector; or a composition ratio based on an atomic ratio or mass ratio of the negative electrode active material is different from that of each of the negative electrode active materials applied to the other surface of the negative electrode collector. As a result, the capacity per unit area on the one surface and the capacity per unit area on the other surface may be different from each other.

Therefore, in the present invention, the capacities per unit area of the first negative electrode 40 and the second negative electrode 50 may be differently formed in the same manner as in the configuration in which the capacities per unit area of the first positive electrode 10 and the second positive electrode 20 are differently formed by combining the above features.

Furthermore, a configuration in which the negative electrode non-coating portion is additionally formed at the opposite end of the second negative electrode 50, and the third and fourth negative electrode, each of which has the negative electrode non-coating portion, are sequentially connected, may also be possible. Here, each of the third negative electrode and the fourth negative electrode, which are connected additionally, may also have a different capacity from that of each of the first and second negative electrodes.

In the electrode assembly having the above configuration according to the present invention, since the positive electrode 100 has the structure in which the first positive electrode 10 and the second positive electrode 20 are bonded to each other, or the negative electrode 200 has the structure in which the first negative electrode 40 and the second negative electrode 50 are bonded to each other, each of the positive electrode 100 and the negative electrode 200 may be determined in capacity per unit area according to whether the first and second positive electrodes or the first and second negative electrodes are disposed at the central side or the outer side to reduce the deviation in N/P ratio when compared to the structure according to the related art.

Here, the capacities per unit area of the first positive electrode 10 and the second positive electrode 20 or the first negative electrode 40 and the second negative electrode 50 may be different from each other, and the first positive electrode and the second positive electrode or the first negative electrode 40 and the second negative electrode 50 have thicknesses different from each other. In addition, since the capacity per unit area of the one surface and the other surface may also be different from each other, the capacity per unit area may be adjusted according to the wound position.

In addition, since the positive electrode tab 30 may be overlappingly bonded to the point at which the positive electrode non-coating portion 21 of the first positive electrode 10 and the positive electrode non-coating portion 21 of the second positive electrode 20 are bonded to each other, or the negative electrode tab 60 may be overlappingly bonded to the point at which the negative electrode non-coating portion 41 of the first negative electrode 40 and the negative electrode non-coating portion 51 of the second negative electrode 50 are bonded to each other, the bonding force between the first positive electrode and the second positive electrode or between the first negative electrode and the second negative electrode may increase.

In addition, in the present invention, a secondary battery, in which the electrode assembly as described above is embedded in the case, may be provided.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: First positive electrode
20: Second positive electrode
30: Positive electrode tab
40: First negative electrode
50: Second negative electrode
60: Negative electrode tab
100: Positive electrode
200: Negative electrode

The invention claimed is:

1. An electrode assembly, in which a positive electrode, a separate, and a negative electrode are wound in a state of being stacked,
wherein the positive electrode comprises a first positive electrode and a second positive electrode,
wherein each of the first positive electrode and the second positive electrode includes a positive electrode active material on a surface of a positive electrode collector,
wherein the positive electrode active material is not applied on one end of the current collector to form a positive electrode non-coating portion on which the positive electrode collector is exposed, wherein the positive electrode non-coating portions of the first positive electrode and the second positive electrode are connected to each other, and wherein a capacity per unit area of the first positive electrode and a capacity per unit area of the second positive electrode are different from each other.

2. The electrode assembly of claim 1, wherein the positive active material applied to the first positive electrode and the positive electrode active material applied to the second positive electrode are manufactured by mixing the same compositions, and wherein a composition ratio of the positive electrode active material applied to the first positive electrode and a composition ratio of the positive electrode active material applied to the second positive electrode are different based on an atomic ratio or a mass ratio so that the capacity per unit area of the first positive electrode and the capacity per unit area of the second positive electrode are different from each other.

3. The electrode assembly of claim 2, wherein an amount of the positive electrode active material applied to the first positive electrode and an amount of the positive electrode active material applied to the second positive electrode are the same.

4. The electrode assembly of claim 1, wherein the positive active material applied to the first positive electrode and the positive electrode active material applied to the second positive electrode are manufactured by mixing the same compositions, and wherein an amount of the positive electrode active material applied to the first positive electrode and an amount of the positive electrode active material applied to the second positive electrode are different so that the capacity per unit area of the first positive electrode and the capacity per unit area of the second positive electrode are different from each other.

5. The electrode assembly of claim 4, wherein the amount of positive electrode active material applied to the first positive electrode and the amount of positive electrode active material applied to the second positive electrode have the same composition ratio based on an atomic ratio or a mass ratio.

6. The electrode assembly of claim 1, wherein the positive active material applied to the first positive electrode and the positive electrode active material applied to the second positive electrode are manufactured by mixing the same compositions, and wherein an amount of the positive electrode active material applied to the first positive electrode and a composition ratio of the positive electrode active material applied to the first positive electrode are different from an amount of the positive electrode active material applied to the second positive electrode and a composition ratio of the positive electrode active material applied to the second positive electrode so that the capacity per unit area of the first positive electrode and the capacity per unit area of the second positive electrode are different from each other.

7. The electrode assembly of claim 1, wherein a positive electrode tab is overlappingly connected to a point at which the positive electrode non-coating portion of the first positive electrode and the positive electrode non-coating portion of the second positive electrode are connected to each other.

8. The electrode assembly of claim 7, wherein the positive electrode tab has a first side welded to the positive electrode non-coating portion of the first positive electrode and a second side welded to the positive electrode non-coating portion of the second positive electrode.

9. The electrode assembly of claim 1, wherein the first positive electrode is manufactured so that at least one of an amount of the positive electrode active material applied to a first surface of the positive electrode collector or a composition ratio based on an atomic ratio or a mass ratio of the positive electrode active material is different from that of the positive electrode active material applied to a second surface of the positive electrode collector so that a capacity per unit area on the first surface and a capacity per unit area on the second surface are different from each other.

10. The electrode assembly of claim 1, wherein the second positive electrode is manufactured so that at least one of an amount of the positive electrode active material applied to a first surface of the positive electrode collector or a composition ratio based on an atomic ratio or a mass ratio of the positive electrode active material is different from that of the positive electrode active material applied to a second surface of the positive electrode collector so that a capacity per unit area on the first surface and a capacity per unit area on the second surface are different from each other.

11. A secondary battery in which the electrode assembly of claim 1 is embedded in a case.

12. The electrode assembly of claim 1, wherein the negative electrode comprises a first negative electrode and a second negative electrode, wherein each of the first negative electrode and the second negative electrode includes a negative electrode active material on a surface of a negative electrode collector, wherein the negative electrode active material is not applied on one end of the current collector to form a negative electrode non-coating portion on which the negative electrode collector is exposed, and wherein the negative electrode non-coating portions of the first negative electrode and the second negative electrode are connected to each other.

13. An electrode assembly, in which a positive electrode, a separate, and a negative electrode are wound in a state of being stacked, wherein the negative electrode comprises a first negative electrode and a second negative electrode, wherein each of the first negative electrode and the second negative electrode includes a negative electrode active material on a surface of a negative electrode collector, wherein the negative electrode active material is not applied on one end of the current collector to form a negative electrode non-coating portion on which the negative electrode collector is exposed, wherein the negative electrode non-coating portions of the first negative electrode and the second negative electrode are connected to each other, and wherein a capacity per unit area of the first negative electrode and a capacity per unit area of the second negative electrode are different from each other.

14. The electrode assembly of claim 13, wherein the negative active material applied to the first negative electrode and the negative electrode active material applied to the second negative electrode are manufactured by mixing the same compositions, and wherein a composition ratio of the negative electrode active material applied to the first negative electrode and a composition ratio of the negative electrode active material applied to the second negative electrode are different based on an atomic ratio or a mass ratio.

15. The electrode assembly of claim 13, wherein an amount of the negative electrode active material applied to the first negative electrode and an amount of the negative electrode active material applied to the second negative electrode are the same.

16. The electrode assembly of claim 13, wherein the negative active material applied to the first negative electrode and the negative electrode active material applied to the second negative electrode are manufactured by mixing the same compositions, and wherein an amount of the negative electrode active material applied to the first negative electrode and an amount of the negative electrode active material applied to the second negative electrode are different.

17. The electrode assembly of claim 13, wherein a negative electrode tab is overlappingly connected to a point at which the negative electrode non-coating portion of the first negative electrode and the negative electrode non-coating portion of the second negative electrode are connected to each other.

18. The electrode assembly of claim 17, wherein the negative electrode tab has a first side welded to the negative electrode non-coating portion of the first negative electrode and a second side welded to the negative electrode non-coating portion of the second negative electrode.

19. The electrode assembly of claim 13, wherein a negative electrode non-coating portion is additionally formed on the first negative electrode at an end opposite to the side connected to the second negative electrode, and a negative electrode non-coating portion is additionally formed on the second negative electrode at an end opposite to the side connected to the first negative electrode, and wherein a negative electrode tab is connected to any one of the negative electrode non-coating portion additionally formed on the first negative electrode or the negative electrode non-coating portion additionally formed on the second negative electrode.

20. A secondary battery in which the electrode assembly of claim 13 is embedded in a case.

* * * * *